(No Model.)
W. F. NAGEL.
DEVICE FOR SECURING BEDCLOTHES ON BEDS.
No. 568,986. Patented Oct. 6, 1896.
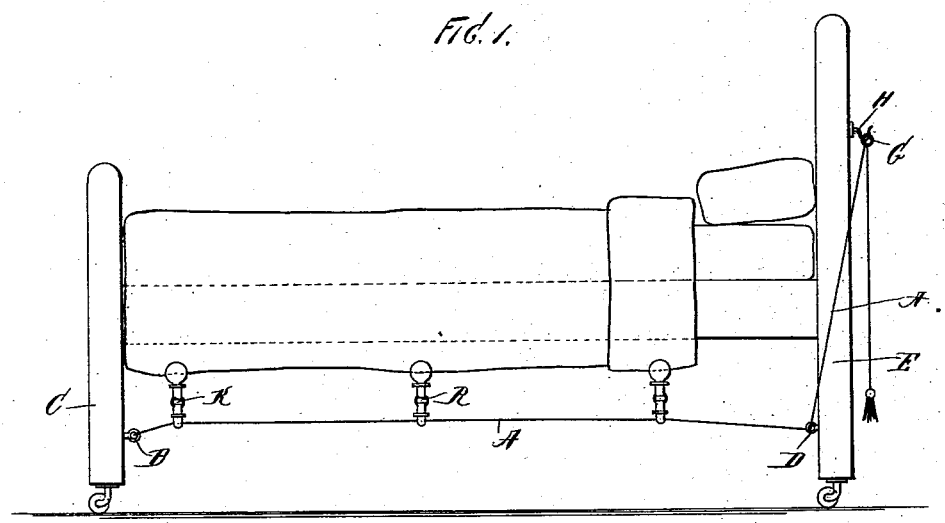
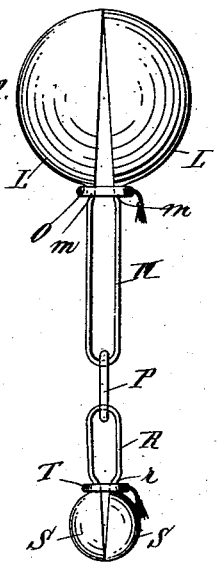
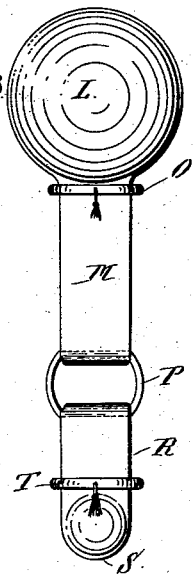
WITNESSES:
INVENTOR
William F. Nagel,
BY
Edgar Tate
ATTORNEYS.

UNITED STATES PATENT OFFICE.

WILLIAM FRANK NAGEL, OF PHILADELPHIA, PENNSYLVANIA.

DEVICE FOR SECURING BEDCLOTHES ON BEDS.

SPECIFICATION forming part of Letters Patent No. 568,986, dated October 6, 1896.

Application filed January 9, 1896. Serial No. 574,800. (No model.)

*To all whom it may concern:*

Be it known that I, WILLIAM FRANK NAGEL, a citizen of the United States, and a resident of Philadelphia, (Roxborough,) in the county of Philadelphia and State of Pennsylvania, have invented certain new and useful Improvements in Devices for Securing or Holding Bedclothing on Beds, of which the following is a specification, reference being had to the accompanying drawings, forming a part thereof, in which similar letters of reference indicate corresponding parts.

This invention relates to devices for securing or holding bedclothing on a bed; and the object thereof is to provide an effective device of this class which is simple in construction and operation and which is particularly adapted for use in connection with children's beds.

The invention is fully disclosed in the following specification, of which the accompanying drawings form a part, in which—

Figure 1 is a side view of a bed provided with my improvement and showing the method of its operation; Fig. 2, an edge view of a clamp which I employ, and Fig. 3 a side view thereof.

In the drawings forming part of this application I have shown in Fig. 1 a bed provided with my improvement, said view being a side elevation of said bed, and said bed being also provided with the usual bedclothes, and in the practice of my invention I provide means for holding the bedclothes in position, consisting of a cord A, which, as shown in the drawings, is connected with a loop or hook B, secured to one of the posts at the foot of the bed and passed through a ring or eye D, secured to one of the posts E at the head of the bed, and said cord is also provided with a ring G, which is adapted to be connected with a hook or other support H, which is secured to the upper portion of the post E. I also employ a plurality of clamps K, which are adapted to be connected with said cord or line A and with the bedclothing, or the sides thereof, and said clamps are composed of two semispherical heads L, which are united by means of a yoke-shaped spring-plate M, the ends of which are secured to or formed in connection with said semispherical bodies, and mounted on the yoke M is a ring O.

Connected with the lower end of the spring-yoke M is a ring P, with which is connected a spring-yoke R, similar in form to the spring-yoke M, and the ends of the yoke R are also provided with semispherical bodies S, which are formed thereon or secured thereto, and mounted on the yoke R is a clamp-ring T, similar to the clamp-ring O and adapted to serve for a similar purpose. The sides of the yoke M, adjacent to the semispherical bodies L, are preferably inwardly contracted, as shown at *m*, and the sides of the yoke R, adjacent to the semispherical bodies S, are also preferably inwardly contracted, as shown at *r*, the object of this arrangement in both cases being to provide means for holding the rings O and P in place.

It will be understood that the clamps K and the cord or line A are connected with each side of the bed or secured thereto, and the same construction may be employed at the foot of the bed, if desired, and the operation will be readily understood from the foregoing description, when taken in connection with the accompanying drawings. The semispherical bodies L serve as means for attaching the clamps to the bedclothing, and the semispherical bodies S as means for connecting the clamps with the cord or line A, and when these parts have been united the end of said cord or line at the head of the bed is drawn tightly and secured to the hook H by means of the ring G or in any desired manner. It will be understood that the cord or line A may be secured at the head of the bed by any desired means, and it will also be seen that by means of this device the bedclothing may be securely held on the bed.

My invention is not limited to the exact form, construction, and arrangement of parts herein shown and described, and I therefore reserve the right to make all such alterations therein and modifications thereof as fairly come within the scope of the invention.

Having fully described my invention, I claim and desire to secure by Letters Patent—

A device for securing or holding bedclothing on beds, consisting of a cord adapted to be stretched along the side between and secured to the posts thereof and devices for holding the bedclothes to said cord, each device consisting of two spring-clamps linked together at the ends opposite their jaws and each being provided with a sliding ring on the shank to bring together and hold said jaws in clasping or holding position, all constructed and arranged as herein shown and described.

In testimony that I claim the foregoing as my invention I have signed my name, in presence of the subscribing witnesses, this 13th day of December, 1895.

WILLIAM FRANK NAGEL.

Witnesses:
THEODORE M. STRICKER,
JOHN L. STICKLE.